(12) United States Patent
Campbell et al.

(10) Patent No.: US 7,614,459 B2
(45) Date of Patent: Nov. 10, 2009

(54) SLIP CLUTCH WITH TWO-ACTION DRIVE SYSTEM ACTIVATION

(75) Inventors: Geoffrey George Campbell, Kensington (AU); Alexander McKechran Hardie McNeil, Gladesville (AU)

(73) Assignee: JLG Industries, Inc., McConnellsburg, PA (US)

( * ) Notice: Subject to any disclaimer, the term of this patent is extended or adjusted under 35 U.S.C. 154(b) by 0 days.

(21) Appl. No.: 11/581,782

(22) Filed: Oct. 17, 2006

(65) Prior Publication Data

US 2008/0105446 A1      May 8, 2008

(51) Int. Cl.
    *B25B 21/02*      (2006.01)
(52) U.S. Cl. ............... 173/1; 173/4; 173/5; 464/45; 192/55.1
(58) Field of Classification Search ............ 464/30, 464/38–40, 43–47; 173/1, 4, 5; 192/55.1
    See application file for complete search history.

(56) References Cited

U.S. PATENT DOCUMENTS

| 460,647 | A |   | 10/1891 | Mills |
| 788,992 | A |   | 5/1905 | Bauer |
| 1,744,976 | A | * | 1/1930 | Axel .................... 81/57.14 |
| 3,056,441 | A | * | 10/1962 | Helms .................... 81/429 |
| 3,115,211 | A |   | 12/1963 | Ostrander, Jr. |
| 3,146,811 | A | * | 9/1964 | Shryock .................... 81/429 |
| 3,737,007 | A |   | 6/1973 | Herrell |
| 3,752,263 | A |   | 8/1973 | Thevenot |
| 4,049,081 | A |   | 9/1977 | McDonald et al. |
| 4,183,423 | A |   | 1/1980 | Lewis |
| 4,194,591 | A |   | 3/1980 | Fisher |
| 4,427,094 | A |   | 1/1984 | Winkelblech |
| 4,488,689 | A | * | 12/1984 | Councilman ............... 242/245 |
| 4,512,440 | A |   | 4/1985 | Bixby |
| 4,592,447 | A |   | 6/1986 | Ream et al. |
| 4,655,103 | A | * | 4/1987 | Schreiber et al. ............ 81/474 |
| 4,809,572 | A | * | 3/1989 | Sasaki .................... 81/429 |
| 5,044,473 | A |   | 9/1991 | Gripe |
| 5,180,042 | A | * | 1/1993 | Ogiso .................... 192/56.1 |
| 5,313,765 | A | * | 5/1994 | Martin .................... 53/317 |
| 5,588,496 | A | * | 12/1996 | Elger .................... 173/178 |
| 5,762,556 | A | * | 6/1998 | Kurian .................... 464/46 |
| 6,095,284 | A |   | 8/2000 | Smith |
| 6,471,004 | B2 |   | 10/2002 | Stringer et al. |
| 6,948,392 | B2 | * | 9/2005 | Eckard et al. ............... 74/7 C |
| 7,047,848 | B2 | * | 5/2006 | Chaterjee et al. ............ 81/475 |

FOREIGN PATENT DOCUMENTS

EP      0 192 170     8/1986
GB      2 211 237     6/1989

* cited by examiner

*Primary Examiner*—Thanh K Truong
(74) *Attorney, Agent, or Firm*—Nixon & Vanderhye P.C.

(57) ABSTRACT

A method of activating a drive system with a portable power source includes performing at least two actions between the power source and the drive system to effect activation. Performing any one of the two actions without the other of the two actions will not activate the drive system. The power source is preferably a hand-held power drill or a power pack.

7 Claims, 3 Drawing Sheets

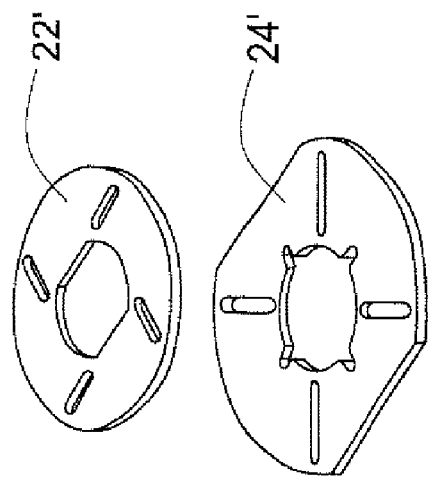
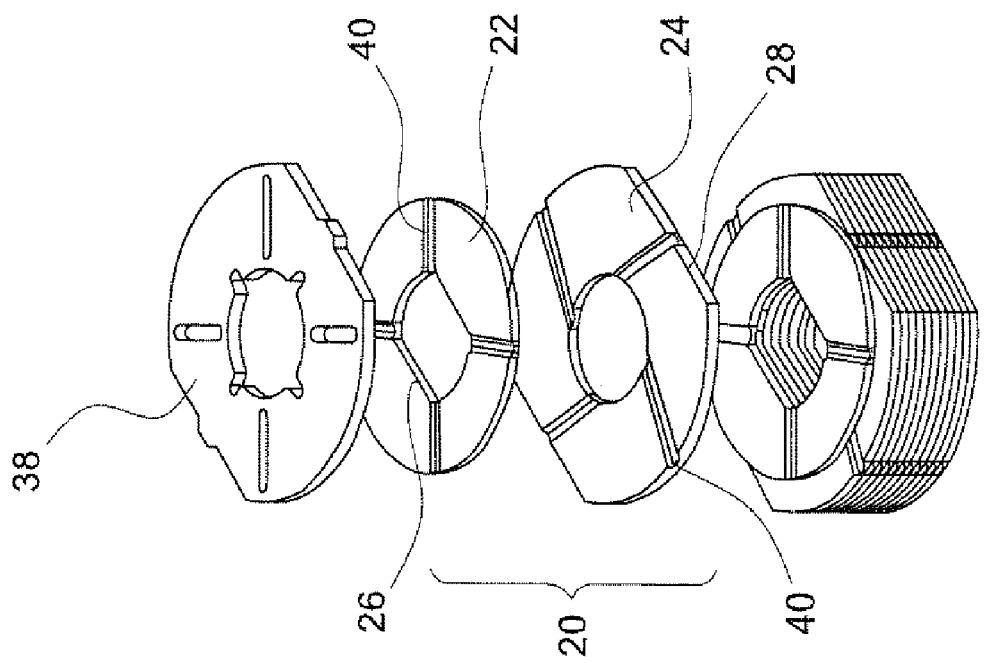

SLIP CLUTCH WITH TWO-ACTION DRIVE SYSTEM ACTIVATION

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND OF THE INVENTION

The invention relates to a clutch assembly and drive activation system and, more particularly, to a drive activation system requiring two actions for activation by a power source such as a hand-held drill or a power pack.

There exist known structures to act as an overload clutch between two members, such as a rotating shaft and a housing. A clutch typically serves to prevent an excessive load on one part or the other by permitting the shaft and housing to slip relative to each other upon the application of excessive torque.

In most applications, it is important that activation of the clutch occurs consistently. Moreover, in some applications, the clutch must be robust to endure normal use. One known clutch arrangement utilizes a slipping plate or the like set on ball bearings. During normal use, however, the ball bearings tend to fracture, eventually requiring replacement of the clutch. Moreover, conventional designs are typically formed of heavier materials, which can be a concern if total weight of the device in which the clutch is installed is an important design consideration.

BRIEF SUMMARY OF THE INVENTION

The slip clutch described herein utilizes lightweight materials of a simple construction that provides consistent and accurate activation upon the application of a torque exceeding a predetermined torque. Although the slip clutch described herein has broad applications, an exemplary application is for use with a mast lifting apparatus including an operator platform that can be raised and lowered on a mast. In the exemplary application, the shaft and housing are rotated by a source of motive power such as a hand-held power drill or the like to drive a worm gear assembly, which in turn rotates a drum to lift the platform on the mast. If the platform reaches its topmost position or becomes stuck in any manner, the application of torque by the source of motive power will exceed an allowable limit, which will thereby activate the clutch described herein to prevent damage to the lifting components.

In an exemplary embodiment of the invention, a method of activating a drive system with a portable power source includes performing at least two actions between the power source and the drive system to effect activation, wherein performing any one of the two actions without the other of the two actions will not activate the drive system. The performing step is preferably carried out such that the at least two actions are performed simultaneously.

In one embodiment, the drive system includes a drive shaft, and the power source is a hand-held drill. In this context, the performing step includes pressing down on the drive shaft as a first action and pulling a trigger on the drill as a second action. In an alternative arrangement, the power source is a power pack, and the performing step includes pressing down on the drive shaft with the power pack as a first action and activating a rotary power source on the power pack as a second action.

The drive shaft is displaceable between a retracted position and an extended position, and in this context, the performing step includes displacing the drive shaft from the retracted position to the extended position as a first action of the two actions. In one arrangement, a stop plate is coupled with the drive shaft, and in the retracted position, the stop plate engages a fixed member to prevent rotation of the drive shaft. In this context, the performing step includes disengaging the stop plate from the fixed member.

In another exemplary embodiment of the invention, a method of activating a drive system uses a hand-held power drill. The method includes the steps of securing the power drill on an end of the drive shaft; then displacing the drive shaft from the retracted position to the extended position and holding the drive shaft in the extended position; and then pulling a trigger on the power drill. The displacing step is preferably practiced by pressing down on the drive shaft.

BRIEF DESCRIPTION OF THE DRAWINGS

These and other aspects and advantages of the present invention will be described in detail with reference to the accompanying drawings, in which:

FIG. 3 is an exploded view showing the clutch plate or washer stack;

FIG. 4 illustrates alternative clutch plate designs;

DETAILED DESCRIPTION OF THE INVENTION

Figure 1:
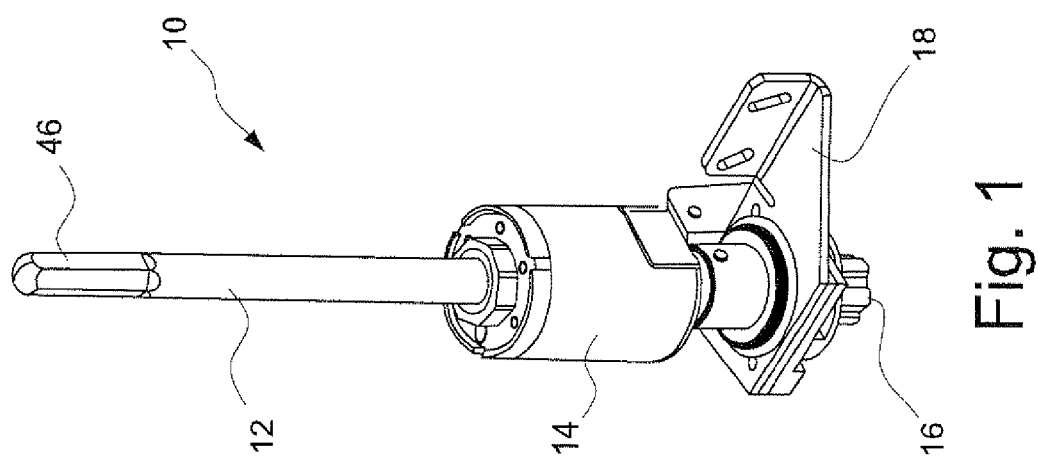
FIG. 1 is a perspective view of the clutch assembly described herein.

FIG. 1 is a perspective view of an overload clutch assembly 10. The clutch assembly 10 acts between a shaft 12 and a housing 14. An engagement gear 16 or the like is rotatable with the housing 14. Also shown is a mounting plate 18 for suitably mounting the assembly.

Figure 2:
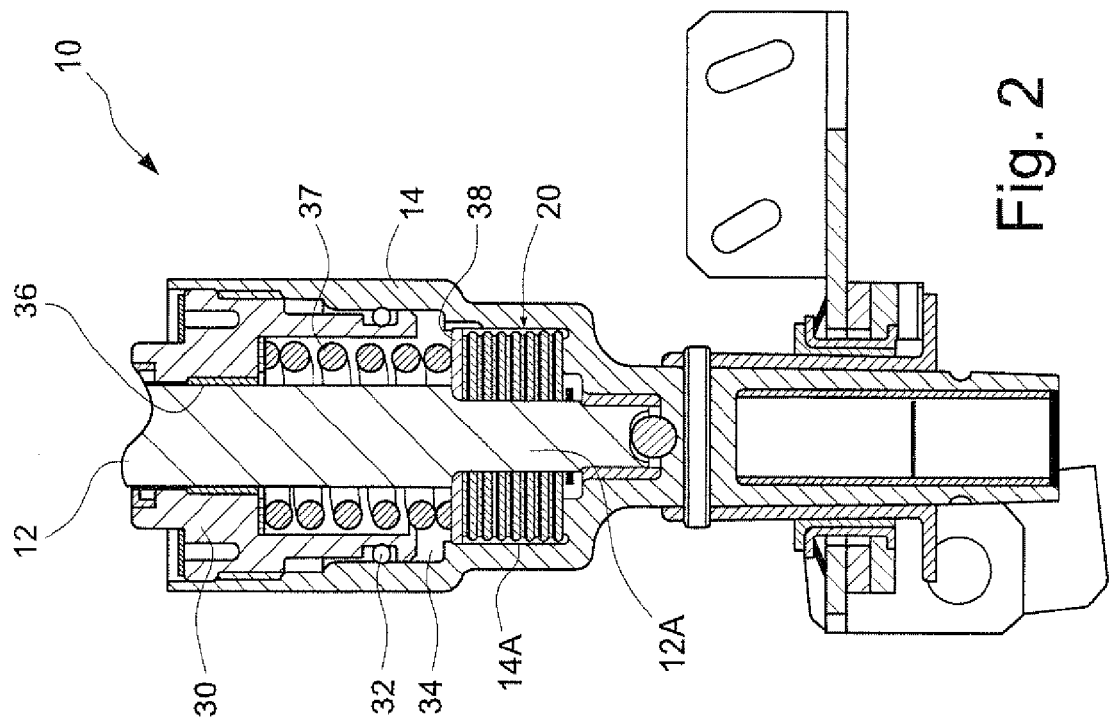
FIG. 2 is a cross-sectional view of the clutch assembly.

FIG. 2 is a cross-sectional view of the clutch assembly 10 through the housing 14. The clutch assembly 10 preferably includes a plurality of stacked clutch plates or washers 20 through which the shaft 12 is inserted. FIG. 3 is an exploded view of the stacked washers 20. The washers 20 include preferably alternating small plates 22 and large plates 24. The small plates 22 are keyed to the shaft 12 by a suitably shaped opening 26 through which the shaft 12 is inserted. The shaft 12 includes a bottom section 12a including key surfaces that engage the corresponding surfaces in opening 26. In this manner, the small plates 22 are rotated with rotation of the shaft 12.

The large plates 24 are keyed to the housing 14 by exterior key surfaces 28. The key surfaces 28 engage correspondingly shaped surfaces 14a within the housing 14.

With continued reference to FIG. 2, a cap member 30 is secured in the housing 14 preferably via a threaded connection and together with an O-ring 32 delimits an oil reservoir 34 within the housing 14. The housing 14 is closed at its bottom and thus contains oil in the oil reservoir 34. The cap member 30 includes a central opening 36 therein receiving a shaft 12. A compression spring 37 is disposed over the shaft 12 between the cap member 30 and a top plate 38 engaging the washer stack 20. A top plate 38 serves to distribute the spring force of the compression spring 37. The spring 37 acts on one regard to maintain a minimum compression force on the stacked washers 20.

As shown in FIG. 3, each of the small plate washers 22 and the large plate washers 24 includes one or more oil grooves 40 therein. Alternative configurations for the washer plates 22, 24 are shown in FIG. 4, referenced as 22', 24'. The oil grooves 40 serve to maintain a consistent film of oil on the washer surfaces by permitting oil in the reservoir to flow between the washers and thereby access the washer surfaces. Of course, those of ordinary skill in the art will appreciate alternative designs and configurations for the washer plates, and the invention is not necessarily meant to be limited to the described and illustrated structure. For example, any other arrangement may be utilized to permit oil from the oil reservoir 34 to flow onto the washer surfaces such as via through holes, slots, notches, etc.

In use, as the shaft 12 is rotated, the housing 14 rotates, which in turn rotates the engagement gear 16. Upon the application of a torque exceeding a predetermined torque, the small plate washers 22 keyed to the shaft 12 will slip relative to the large plate washers 24 keyed to the housing 14. As such, the shaft 12 will continue to rotate while the housing 14 remains stationary.

A preferred material for the washers 22, 24 is hardened steel, which provides excellent consistency and robustness. The collection of materials is very lightweight compared to conventional clutch arrangement. Moreover, by immersing the washer stack 20 in an oil reservoir 34, the predetermined torque over which the clutch assembly 10 is activated is accurate and consistent regardless of environmental conditions, such as temperature, humidity, etc. as the characteristics of the oil do not vary significantly in different environmental conditions or over time. The consistency is provided by the metal against metal oil film engagement, which is not attainable with a rubber brake pad or the like against a metal rotor. Moreover, the performance of brake pads and similar rubber or synthetic products could vary considerably in different environmental conditions.

The specific predetermined torque can be set for a specific application and can be adjusted by adjusting a spring force of the spring 37, by changing the number of washers in the washer stack 20, or by adjusting a position of the cap member 30, e.g., via the threaded connection to the housing 14. A lower compression force by spring 37 reduces the predetermined torque, and a higher spring force increases the predetermined torque.

With the structure configured as described herein, a torque range for activation/deactivation of the clutch can be 15% or less. That is, assuming it is desirable for the shaft 12 to slip upon an application of 2.5 ft-lbs or higher, the structure described herein is consistent and accurate to ensure that a driving torque of 2.2 ft-lbs or lower will never activate the clutch, regardless of environmental conditions. This consistent but small window is beneficial in designing components in which the clutch assembly is incorporated.

Although the clutch assembly described herein is shown using a plurality or stack of washers 20, the assembly may function properly with as little as a single plate member against a bottom wall of the housing 14. The number of plate members/washers may be varied to vary the torque activation level and/or the weight of the assembly.

Figure 6:
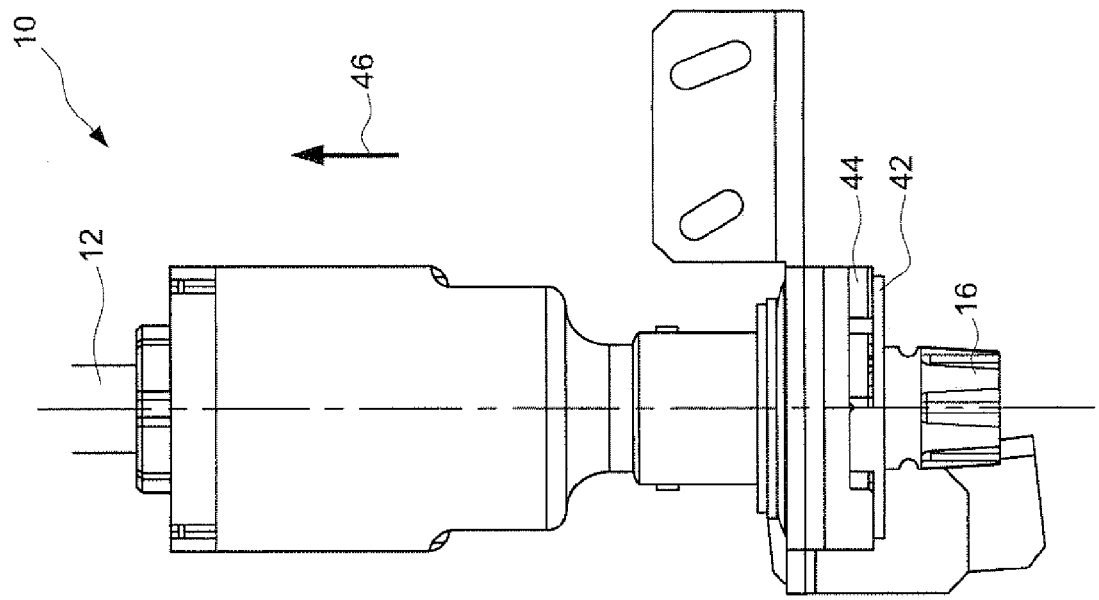
FIG. 6 shows the actuation feature in the engaged position.
Figure 5:
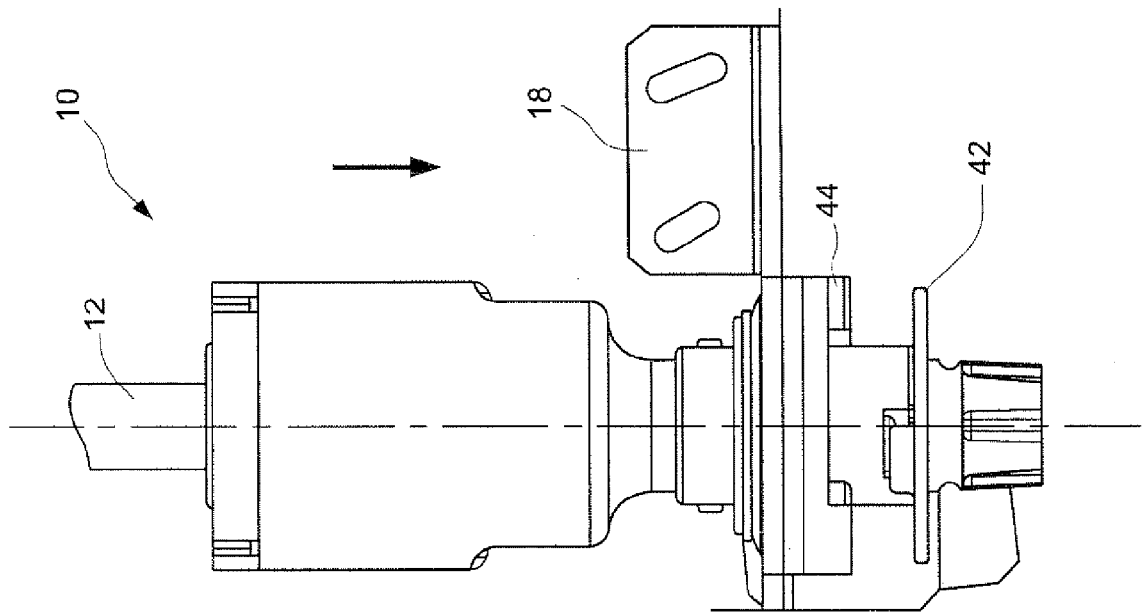
FIG. 5 shows an actuation feature of the clutch assembly in a disengaged position.

A second component of the clutch assembly will be described with reference to FIGS. 5 and 6. A stop plate 42 is coupled with a lower end of the shaft 12. The mounting bracket 18 includes a fixed member 44 to which the rotating plate 42 is selectively engageable. In an idle position (as shown in FIG. 6), a spring force 46 acting below the engagement gear 16 urges the shaft toward a retracted position where the rotating plate 42 engages the fixed member 44, thereby preventing rotation of the shaft 12. In order to free the rotating plate 42 from the fixed member 44, the operator is required to press down on the shaft 12 against the spring force 46 to clear the rotating plate 42 from the fixed member 44.

In the exemplary application to a mast lift described above, the shaft 12 may include an operating end 46 (FIG. 1) shaped to engage a motive power source. An exemplary motive power source is a hand-held power drill. In use, the power drill can be provided with a suitably-sized bit for engaging the shaft end 46. The user engages the power drill with the shaft end 46 and presses down on the shaft 12 to displace the shaft 12 from its retracted position (FIG. 6) to its extended position (FIG. 5). Subsequently, the user can activate the drill to rotate the shaft 12. Activation of the shaft 12 thus requires two independent actions, being press down and pull trigger. It is preferable that the two actions are performed simultaneously. It is further preferable that the shaft 12 be first pressed down as pulling the trigger without pressing down on the shaft 12 would activate the slip clutch assembly described above. In this manner, this provides a safety feature in the event the drill or other power source slips off the shaft 12 during use. Moreover, the use of two independent actions satisfies ANSI standard requirements.

An alternative arrangement in the exemplary mast lift application utilizes a power pack that is securable over the shaft. The power pack includes an internal source of motive power to rotate the shaft 12 according to an activation button or the like on the power pack. When the power pack is attached to the unit, the power pack displaces the shaft 12 to the extended position. The power pack itself may include a two-action activator such as a lever with a deadman switch or the like.

The clutch assembly described herein utilizes lightweight and inexpensive parts while performing accurately and consistently. The structure is robust and can withstand normal use over longer periods of time than with conventional assemblies. The clutch assembly enables efficient use of a hand-held power drill or the like to safely and efficiently provide a rotating force for a gear assembly while preventing damage due to overloading.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of activating a drive system with a portable drive source, the drive system including a drive shaft displaceable between a disengaged position, in which an engagement gear of the drive system is disengaged and an engaged position, in which the engagement gear of the drive system is engaged, the method comprising releasably engaging the drive system with the drive source without displacing the drive shaft, and, with the drive source engaging the drive system, performing at least two actions between the drive source and the drive system to effect activation of the drive system, the two actions including displacing the drive shaft to the engaged position and activating the drive source, wherein performing any one of the two actions without the other of the two actions will not activate the drive system, wherein a stop plate is coupled with the drive shaft, and wherein in the disengaged position, the stop plate engages a fixed member to prevent rotation of the drive shaft, the performing step comprising disengaging the stop plate from the fixed member.

2. A method according to claim 1, wherein the performing step comprises performing the at least two actions substantially simultaneously.

3. A method according to claim 2, wherein the drive source is a hand-held drill, the performing step comprising pressing down on the drive shaft as a first action and pulling a trigger on the drill as a second action.

4. A method according to claim 2, wherein the drive source is a drive pack including a rotary drive source, the performing step comprising pressing down on the drive shaft with the drive pack as a first action and activating the rotary drive source on the drive pack as a second action.

5. A method according to claim 1, wherein the drive source is a hand-held drill, the performing step comprising pressing down on the drive shaft as a first action and pulling a trigger on the drill as a second action.

6. A method of activating a drive system using a hand-held power drill, the drive system including a drive shaft displaceable between a disengaged position, in which an engagement gear of the drive system is disengaged and an engaged position, in which the engagement gear of the drive system is engaged, the method comprising:

releasably securing the power drill on an end of the drive shaft with the drive shaft in the disengaged position, wherein operation of the power drill with the drive shaft in the disengaged position will not activate the drive system; then displacing the drive shaft from the disengaged position to the engaged position and holding the drive shaft in the engaged position; and then pulling a trigger on the power drill with the drive shaft in the engaged position to activate the drive system, wherein a stop plate is coupled with the drive shaft, and wherein in the disengaged position, the stop plate engages a fixed member to prevent rotation of the drive shaft, the displacing step comprising disengaging the stop plate from the fixed member.

7. A method according to claim 6, wherein the displacing step is practiced by pressing down on the drive shaft.

* * * * *